United States Patent
Lorenzi et al.

(10) Patent No.: US 10,316,481 B2
(45) Date of Patent: Jun. 11, 2019

(54) SHORE PROTECTION INFRASTRUCTURE EQUIPPED WITH MEANS FOR RECOVERING ENERGY FROM WAVE MOTION

(71) Applicants: EL.MA ELECTRONIC MACHINING S.r.l., Riva del Garda (IT); Davide Lorenzi, Riva del Garda (IT)

(72) Inventors: Davide Lorenzi, Riva del Garda (IT); Lorenzo Luminari, Varone di Riva del Garda (IT)

(*) Notice: Subject to any disclaimer, the term of this patent is extended or adjusted under 35 U.S.C. 154(b) by 0 days.

(21) Appl. No.: 15/772,001

(22) PCT Filed: Oct. 27, 2016

(86) PCT No.: PCT/IB2016/056467
§ 371 (c)(1),
(2) Date: Apr. 27, 2018

(87) PCT Pub. No.: WO2017/072690
PCT Pub. Date: May 4, 2017

(65) Prior Publication Data
US 2018/0223492 A1    Aug. 9, 2018

(30) Foreign Application Priority Data

Oct. 30, 2015   (IT) .............................. UB2015A5267
Oct. 30, 2015   (IT) .............................. UB2015A5352

(51) Int. Cl.
*E02B 9/08*     (2006.01)
*E02B 3/06*     (2006.01)
(Continued)

(52) U.S. Cl.
CPC ................ *E02B 3/064* (2013.01); *E02B 3/06* (2013.01); *E02B 3/062* (2013.01); *E02B 9/08* (2013.01);
(Continued)

(58) Field of Classification Search
CPC ... E02B 9/08; E02B 3/06; E02B 3/062; E02B 3/064; E02B 3/066; E02B 3/068; F03B 13/14; F03B 13/26
(Continued)

(56) References Cited

U.S. PATENT DOCUMENTS 1,163,451 A       5/1875   Buckner
  870,706 A  *  11/1907   Woodard ............ F03B 13/1885
                                                              290/55
(Continued)

FOREIGN PATENT DOCUMENTS

AT         385301 B      3/1988
GB        2239293 A      6/1991
(Continued)

OTHER PUBLICATIONS

International Search Report for PCT/IB2016/056467, dated Feb. 8, 2017.

*Primary Examiner* — Frederick L Lagman
(74) *Attorney, Agent, or Firm* — Seyfarth Shaw LLP (57) ABSTRACT

Described is an infrastructure for recovering and storing energy received from wave motion of lakes or sea water basins, comprising a floating or fixed quay, jetty or pier (10) substantially consisting of a platform (11) in the lower part of which are fixed walls (12, 13, 14) equipped with openings (17) for the passage of the wave motion towards inner chambers (15, 16), wherein the inner chambers comprise units for recovering the energy from the wave motion, comprising floats (18) connected by kinematic means (19, (Continued)

20) to at least one transmission shaft (22) in turn associated with a unit (24) which transforms the mechanical energy into directly usable or storable electricity, the kinematic means (19, 20) being capable of converting the sussultatory motion of the floats (18) into rotary motion of the shaft (22) allowing the recovery of electricity from the relative transformation unit (24).

19 Claims, 6 Drawing Sheets (51) Int. Cl.
F03B 13/14 (2006.01)
F03B 13/18 (2006.01)
(52) U.S. Cl.
CPC ............ F03B 13/14 (2013.01); F03B 13/186 (2013.01); F03B 13/1815 (2013.01); F05B 2240/40 (2013.01); Y02A 10/15 (2018.01); Y02E 10/38 (2013.01)
(58) Field of Classification Search
USPC .......................................................... 405/76
See application file for complete search history.

(56) References Cited

U.S. PATENT DOCUMENTS

| 1,061,061 | A | * | 5/1913 | Frame | F03B 13/1815 60/505 |
|---|---|---|---|---|---|
| 2,783,022 | A | * | 2/1957 | Salzer | F03B 13/186 405/76 |
| 4,141,670 | A | * | 2/1979 | Russell | F03B 13/145 290/53 |
| 4,154,548 | A | | 5/1979 | Ijima | |
| 4,189,918 | A | * | 2/1980 | Moody | F03B 13/142 290/53 |
| 4,216,655 | A | * | 8/1980 | Ghesquiere | E02B 9/08 290/53 |
| 4,403,475 | A | * | 9/1983 | Kondo | F03B 13/184 290/53 |
| 4,698,969 | A | | 10/1987 | Raichlen et al. | |
| 4,984,935 | A | * | 1/1991 | de Oliveira Filho | B63B 35/44 114/263 |
| 5,186,822 | A | * | 2/1993 | Tzong | B01D 61/10 210/122 |
| 5,192,161 | A | | 3/1993 | Helgesson | |
| 5,222,833 | A | * | 6/1993 | Gorlov | E02B 9/08 290/53 |
| 5,507,943 | A | * | 4/1996 | Labrador | F03B 13/186 290/53 |
| 6,145,463 | A | | 11/2000 | Zeilinger | |
| 6,443,653 | B1 | * | 9/2002 | Zingale | F03B 13/1845 405/75 |
| 6,644,027 | B1 | * | 11/2003 | Kelly | F03B 13/1845 60/498 |
| 7,242,106 | B2 | * | 7/2007 | Kelly | F03B 13/1815 60/505 |
| 7,585,131 | B2 | * | 9/2009 | Oigarden | F03B 13/1845 405/75 |
| 7,830,032 | B1 | * | 11/2010 | Breen | F03B 13/142 290/53 |
| 7,841,177 | B1 | * | 11/2010 | Detwiler | F03B 13/186 290/53 |
| 8,093,743 | B2 | * | 1/2012 | Bozano | F03B 13/145 290/53 |
| 8,125,097 | B1 | * | 2/2012 | Lomerson, Sr. | F03B 13/1845 290/53 |
| 2008/0038061 | A1 | * | 2/2008 | Morse | B63B 35/00 405/76 |
| 2014/0183122 | A1 | * | 7/2014 | Canals | B63B 35/00 405/76 |

FOREIGN PATENT DOCUMENTS

| JP | H02221682 A | 9/1990 | |
|---|---|---|---|
| WO | WO-2012176205 A1 * | 12/2012 | E02B 9/08 |

* cited by examiner

SHORE PROTECTION INFRASTRUCTURE EQUIPPED WITH MEANS FOR RECOVERING ENERGY FROM WAVE MOTION

TECHNICAL FIELD

This invention relates to a system for the recovery and storage of energy received from wave motion of lakes or sea water basins associated with an infrastructure for protecting the shore of the breakwater quay type.

Substantially, the system according to the invention recovers the energy produced by the wave motion of the water present in lakes or sea water basins, during the vertical oscillation of the surface, through the use of one or more floating units, each connected by a crank mechanism, or a rack-type kinematic means, or to a free wheel which rotates a shaft connected in turn to a handwheel associated with a unit for the recovery and storage of the mechanical energy, the means being positioned inside a quay representing a breakwater barrier.

According to the invention, the forces produced by the thrusts of the wave motion attenuated by the breakwater barrier on which the energy recovery unit is positioned allow the sussultatory movement of suitable floating elements, which convert the vertical movements into rotational movements of the drive shaft to which they are connected.

The torques in question produced by a crank mechanism which connects the floats to the drive shaft are very high but with a low frequency, transforming the wave motion from transversal to longitudinal relative to the axis of a quay on which the device may be applied, also increasing the frequency of the level variation and simultaneously attenuating the impetus of the waves if the quay delimits a port externally.

This invention applies to the sector of embodiments for exploiting natural energy linked with shore protection works, in particular in the sector of the energy generators using sea waves installed on quays with breakwater functions.

BACKGROUND ART

It is known that the motion of the waves produced by the wind in the sea or lakes represents a source of energy which consists in the use of the kinetic energy contained in the wave motion, from which it takes its name. It is classified amongst the so-called "alternative energies" and "renewable energies".

The use of the energy of wave motion has been recently trialled in various European research projects in the energy field and in particular if the wave motion is used for the production of electricity the system is called chemoelectrical.

There are various techniques for using the wave motion and the conversion of the energy of the waves into electricity is the subject of various studies and embodiments, based on various physical principles.

There are prior art technical solutions wherein energy is obtained from the wave motion of the sea using devices, generally floats, which perform a guided movement according to a vertical alignment with each passage of the wave.

For example, according to some solutions, through the passage of the waves in a channel with a progressively decreasing width or by means of special ramps, the waves reach greater heights and it is therefore possible to fill a basin to a higher level than that of the level of the water basin. The continuous flow of the water collected, using suitable civil works, and the passage through turbines hydraulic, allows the generation of a certain quantity of electricity.

According to further solutions, the movement of the waves can actuate hydraulic motors to be coupled to an electricity generator through the use of a semi-submerged floating structure, comprising various long elements connected in series with special joints, which is moved by the waves varying the relative inclination of the various elements. Specific hydraulic pistons located at the joints put a fluid in motion, under pressure in an internal circuit, which drives the hydraulic motor, installed inside one of the elements.

There are also prior art plants for using waves comprising a submerged structure anchored to the sea bed, equipped with an air chamber, which is subject to decompression-compression cycles due to the variation, created by the waves, of the column of water above, and other systems consisting of a float, anchored to the sea bed by a system which is able to transfer the mechanical energy of the relative motion between the sea bed and the float, by means of suitable mechanisms, to a generator.

The use of these prior art systems for the use of wave motion has highlighted certain problems, the main one of which is represented by efficiency or performance limitations due to the low frequency of the wave motion, when, on the contrary, high speeds are preferable for the operation of electricity generators.

More specifically, the current systems for using energy deriving from the recovery of the wave motion are subject to the sudden changes, often considerable, to the waves due in some cases to the variation of the tides or to the different weather conditions or in other cases to the different intensity of the passage of boats.

These variations of the flow of the wave motion determine an irregularity of the thrusts exerted on the traditional energy recovery means, creating difficulty in establishing a mean undulation useful for the conversion of the sussultatory motion into constant motion of the crank mechanism.

The above-mentioned problems have been encountered for example in the solutions of patent documents U.S. Pat. No. 4,698,969, JP H02 221682, GB 2239293 and US 163451, which involve the use of means for recovering energy from the wave motion associated with containment structures which are completely inadequate to limit the variations, which are often very high, in the intensity of the wave motion.

DESCRIPTION OF THE INVENTION

The aim of this invention is to provide a system for the recovery and storage of energy received from wave motion of lakes or sea water basins through the use of floats connected to a crank mechanism thereby creating a condition which is able to eliminate or at least reduce the above-mentioned drawbacks relating to the irregular frequency of the wave motion.

The invention aims in particular to provide a system for the recovery and storage of energy which derives from the wave motion, through the combination between a floating or fixed quay, jetty, pier or mooring and an energy recovery system, which allows the vertical oscillation of the wave motion to be exploited, linking it with a plurality of floats which transfer the motion to a shared rotation shaft.

This is achieved by means of a system for the recovery and storage of energy received from wave motion, the features of which are described in the main claim.

The dependent claims of the solution according to this invention describe advantageous embodiments of the invention.

The main advantages of this solution relate to the fact that for the recovery of the energy from the water, during its vertical oscillation use is made of one or more floating units placed inside a suitable quay or coastal barrier of the type suitable for attenuating and regulating the wave motion, and each is connected with a crank mechanism or other rack-type kinematic device, to a free wheel which rotates a shaft connected in turn to a handwheel and a unit for recovery/storage of the mechanical energy.

DESCRIPTION OF THE DRAWINGS

Other features and advantages of the invention will become clear on reading the description given below of one embodiment, provided as a non-limiting example, with the help of the accompanying drawings, in which.

DESCRIPTION OF AN EMBODIMENT OF THE INVENTION

Figure 1:
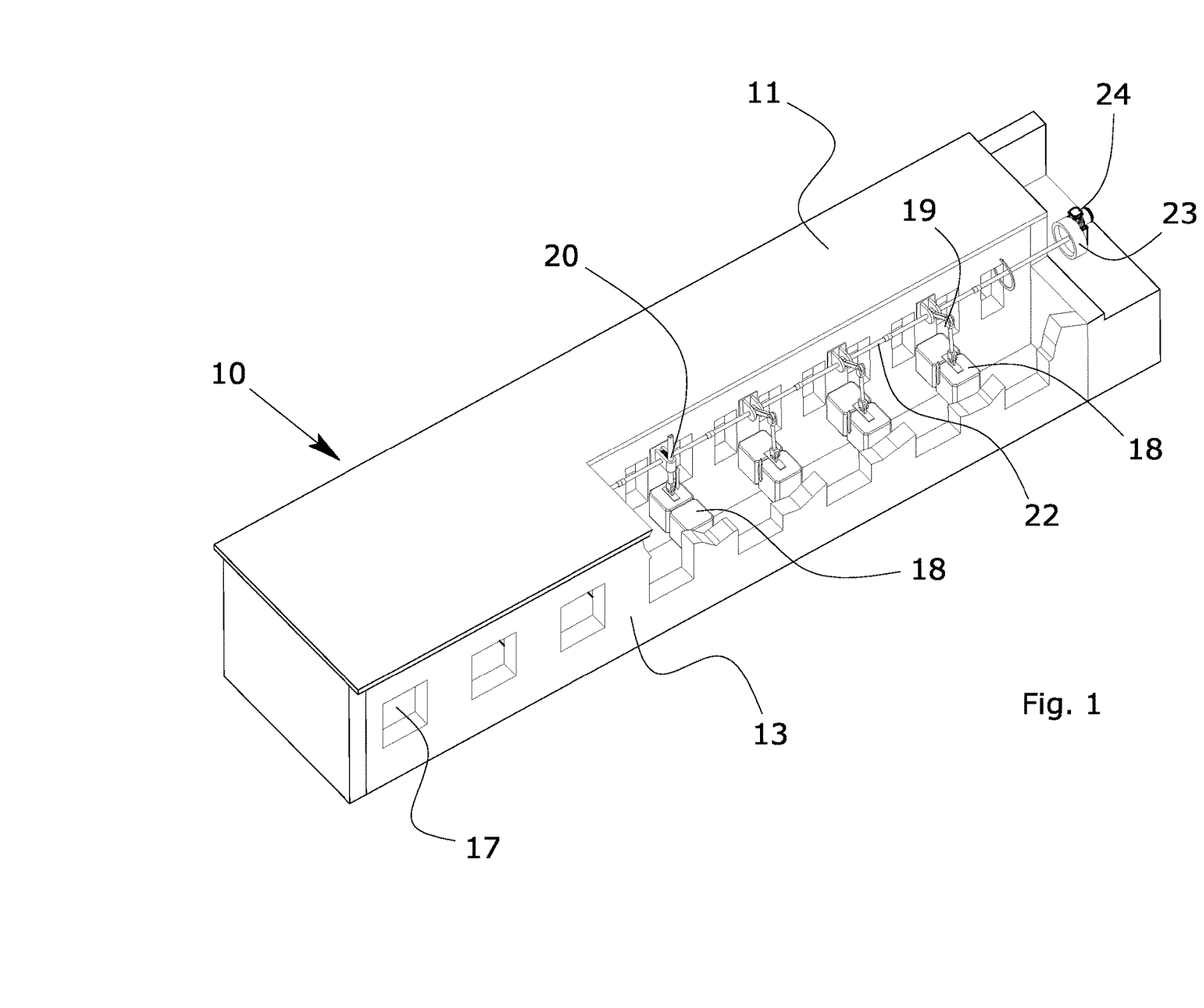
FIG. 1 shows a schematic and perspective view highlighting the system according to the invention for the energy recovery in its entirety inserted inside a barrier of the quay type equipped with means for the partial dampening of the wave motion.

With reference to the accompanying drawings, and initially in particular to FIG. 1, the system according to the invention for the recovery and storage of energy received from wave motion of lakes or sea water basins uses an infrastructure represented by a quay, jetty, pier, or moorings, 10 inside of which are positioned means for recovering energy from the wave motion.

Figure 2:
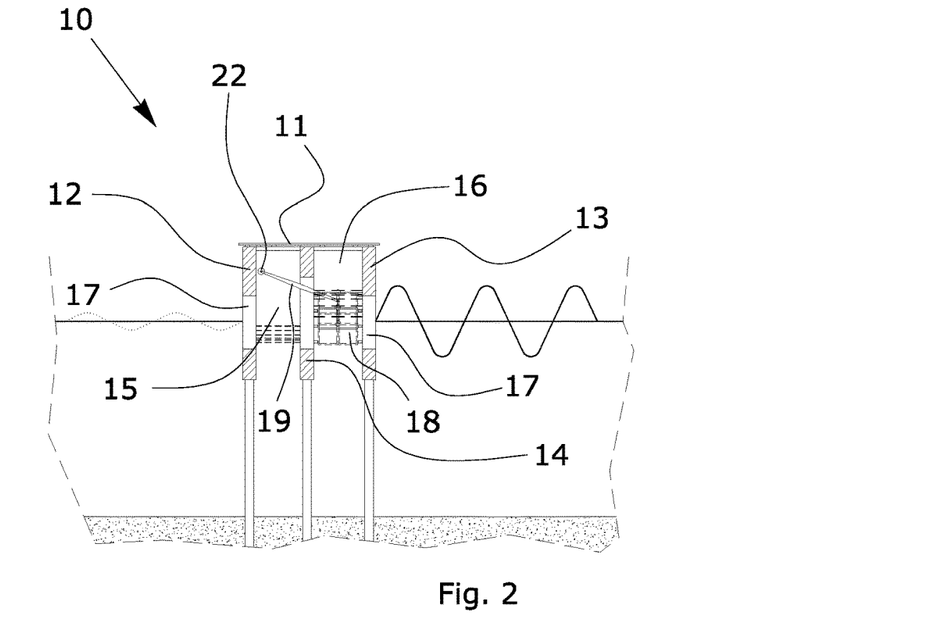
FIGS. 2 and 3 are schematic cross section views on a vertical plane highlighting the quay of the previous drawing, referred to a first and a second embodiment in which the energy recovery means are inserted.
Figure 3:
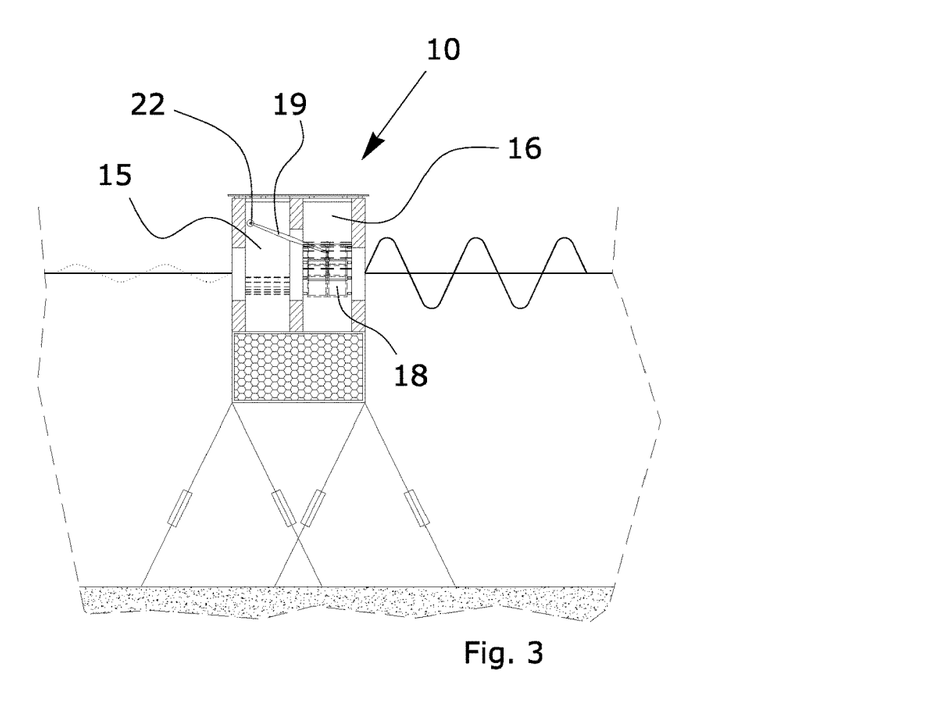

The infrastructure 10 consists substantially of a platform 11 in the lower part of which are fixed vertical walls positioned parallel to each other to form two outer walls 12 and 13 and one or more intermediate central internal walls 14, as shown in FIGS. 2 and 3.

More in detail, the vertical walls 12 fixed beneath the platform 11 define chambers 15 and 16 in which are positioned the units for recovery of energy from the wave motion, as will be described below.

Moreover, the vertical walls 12, 13 and 14 are provided with openings or windows 17 the size and position of which varies depending on whether the windows are arranged on the outer, central or inner side of the walls of the quay relative to the layout of the port opposite to the origin of the wave motion.

Figure 4:
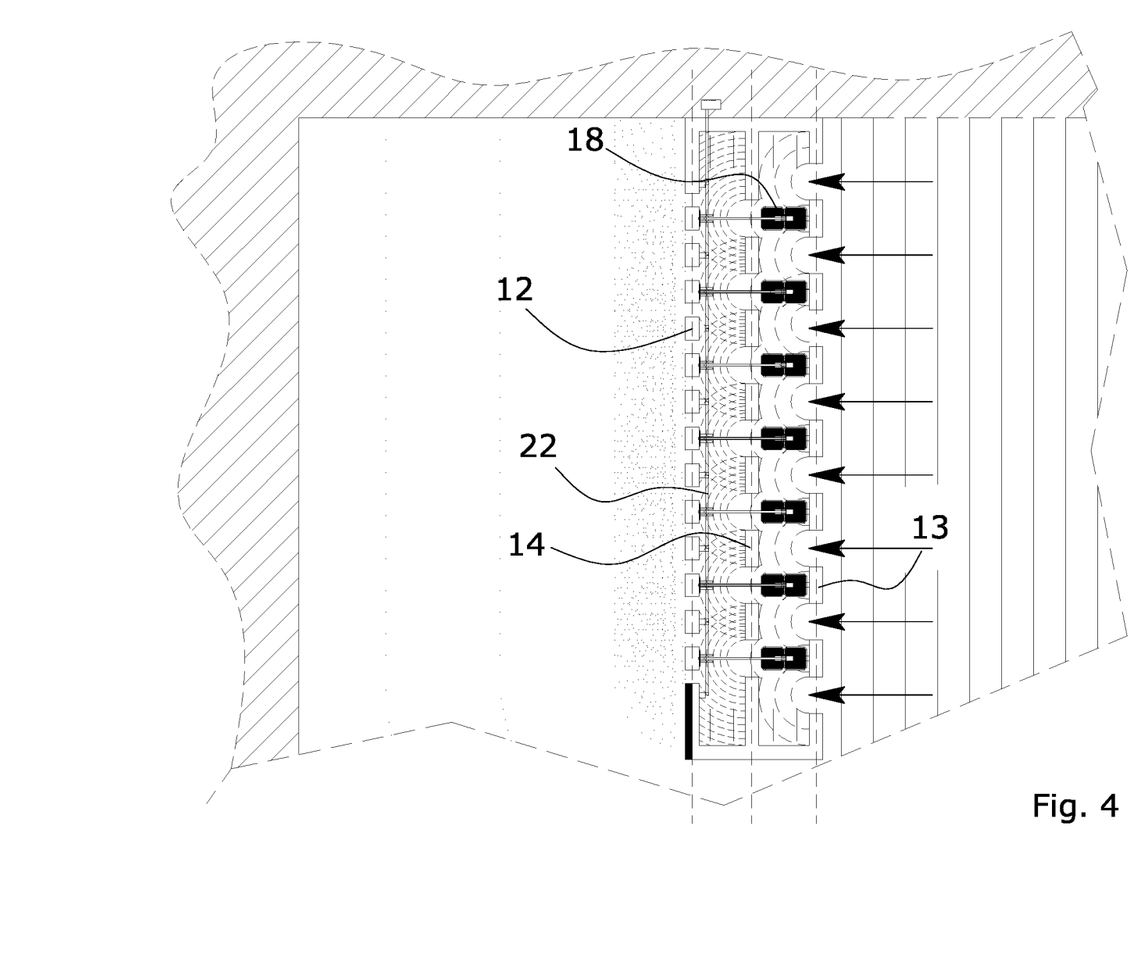
FIG. 4 is a schematic view of the quay on the plane of the horizontal centre line, in which the energy recovery means are inserted.
Figure 5:
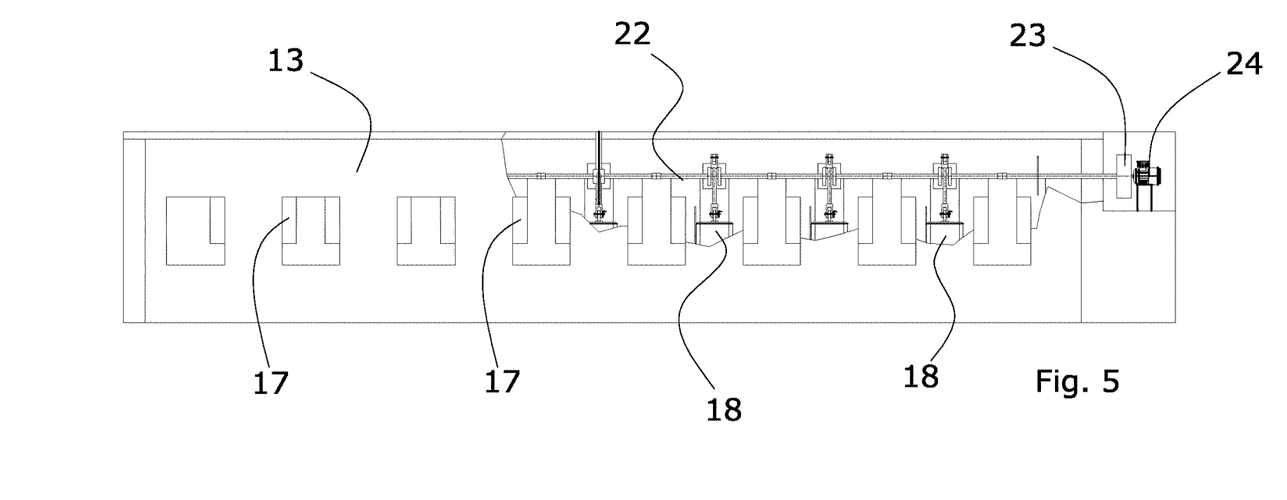
FIGS. 5 and 6 are side and plan views, respectively, of an example of the system according to the invention, comprising the energy recovery means.
Figure 6:
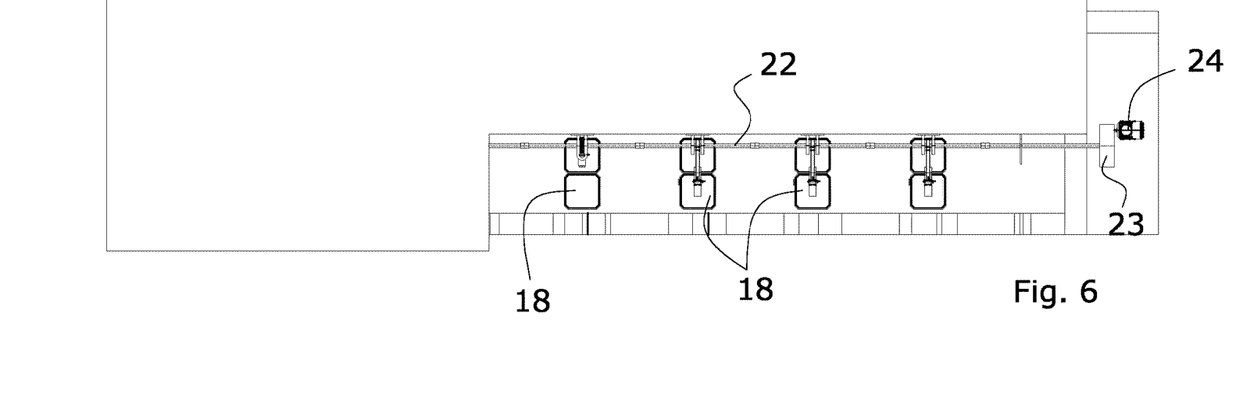

More specifically, the windowed openings 17 are positioned offset in the transversal direction of the quay depending on their position on the vertical walls 12, 13, 14, in such a way that the wave motion can pass through the quay, breaking up subsequently during the passage from one windowed wall to the other, up to almost totally breaking up at the innermost wall, as illustrated in the diagram of FIG. 4.

The dissipation of the wave motion which breaks against the openings or windows 17 of the vertical walls 12, 13 and 14 occurs by front diffraction and side reflection of the wave, thus obtaining a gradual attenuation.

According to the invention, means are positioned inside the quay, jetty, pier or moorings for recovering the energy generated by the sea or lake waves, the means consisting of a plurality of floats 18, placed inside one of the two chambers, in particular in the chamber 16 adjacent to the wall 13 facing towards the outside of the quay relative to the direction of the wave motion.

According to further embodiments, the recovery means can be located inside any of the chambers 15 or 16 defined by the vertical walls 12, 13 and 14, selecting the different location on the basis of the different requirements which derive from the type of means for recovering the energy from the wave motion or the type of waves in the zone where the infrastructure is installed.

Figure 7:
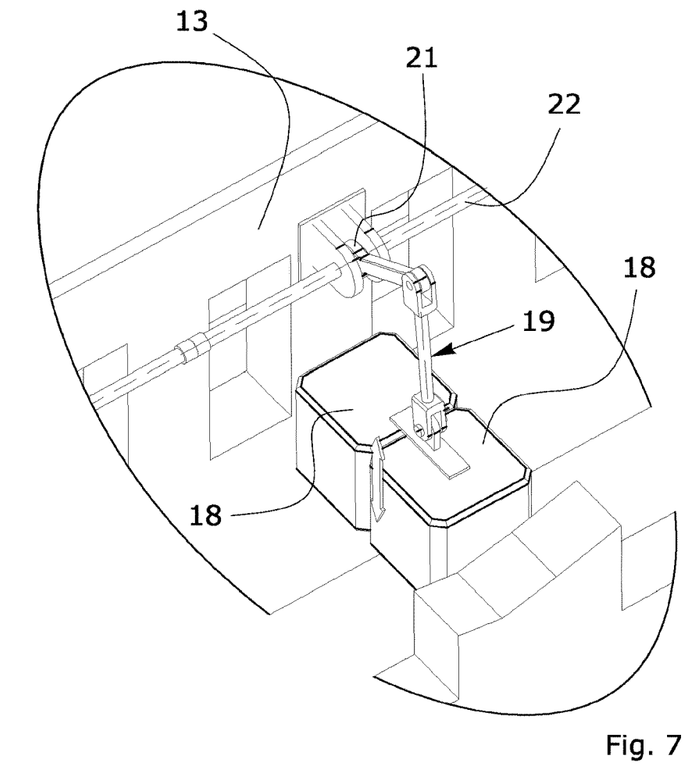
FIGS. 7 and 8 show schematic and perspective views highlighting two possible mechanical units which transform the wave motion into rotational motion of the transmission shaft, inserted inside a quay or the like of the breakwater type.
Figure 8:
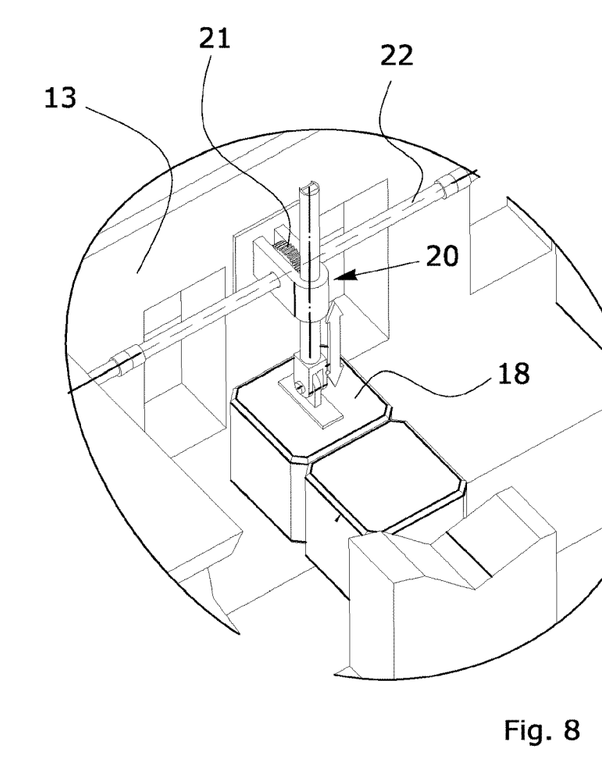
Figure 9:
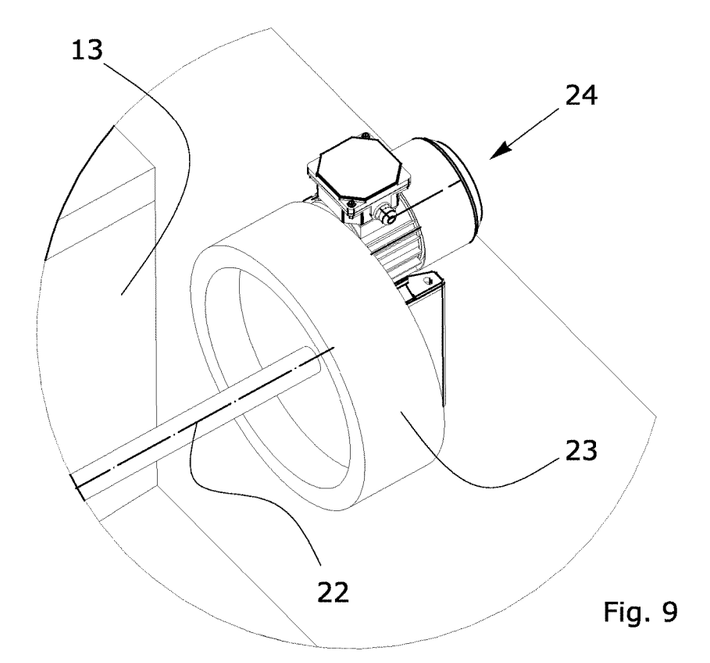
FIG. 9 is a schematic view highlighting the energy storage the device driven by the transmission shaft inserted inside a quay or the like of the breakwater type.

The floats 18, which are the subject of vertical oscillation whilst they float on the waves which enter through the windows 17 of the outer wall 13 of the quay, are connected by a crank mechanism 19 (FIG. 7), or other rack-type kinematic device 20 (FIG. 8), to a respective free wheel 21 which rotates a shaft 22 connected in turn to a handwheel 23 and in succession to a unit 24 for recovery and storage of the mechanical energy which is converted into electricity (FIG. 9).

The unit 24 for storing and/or transforming the mechanical energy recovered from the oscillating vertical movement is positioned above the water level, preferably towards the side of the quay facing land to facilitate the operations both during installation and maintenance in the event of operational problems.

The shaft 22 is anchored to the wall of the quay, preferably to the middle inner wall 14, and during vertical oscillation of the floats the respective free wheels 21 rotate the shaft 22 with the torque depending on the vertical thrust of the float whilst the downward movement of the float will occur by means of the weight force.

The free wheels 21 are used for the operation and the energy supply of various floats, independently of the offset angle of one relative to the other, allowing with the increase in the frequency of the pulses a higher speed of rotation of the shaft 22. A thrust and consequent energy supply of the free wheels 21 over the shaft 22 derives from a sum of independent thrusts of each float 18.

It may be necessary to use a rpm multiplier connected to the transmission shaft which drives an electricity generator to obtain the electricity at the voltage and frequency conditions required.

The energy recovery unit 24 is of mechanical or electromechanical type, or is integrated electronically, and if the energy is intended to be accumulated, that is, stored, super-capacitors for charging accumulators are installed after the handwheel. With this solution the energy can be used on request.

If electricity is to be obtained with constant power use is made of a mechanism for storing potential energy to be converted continuously when it is needed, at the voltage and frequency conditions required by the user, the mechanism comprising a certain number of helical or flat or wire springs.

In situ the waves coming from the outer side and/or exposed to the wave motion of the quay 10, after having crossed the quay and having been dampened by the arrangement of the windowed openings 17, are reflected causing an alternating variation of level of the floats themselves inside the quay, jetty, pier and/or moorings, with a thrust, depending on the difference of the levels, even if reduced, upwards useful for operating the connecting rods 19 or the racks 20 for transmitting the motion.

Each variation of the water level is captured by the floats 18 which, suitably guided, transmit a force upwards equal to the weight of the volume of water moved, as set out in the Archimedes principle.

The two internal longitudinal corridors of the quay comprising the chambers 15 and 16, are used, respectively, for containing floatation tanks and for the supports, arranged on the upper part of the quay above the water level, of the motion-transmitting shaft.

As may be seen in FIGS. 2 and 3, the quay 10 is anchored to the sea bed by means of fixed piles 25 (FIG. 2), or, if floating, by means of anchor cables 26 equipped with suitable tensioning devices 27 (FIG. 3), the number and dimensions of which depend on the dimensions of the quay and the context in which it is positioned.

In conclusion, the forces generated by the sea or lake waves which pass through the openings 17 of the walls 12, 13 and 14 which form the quay 10 and which are transferred onto the floats and then onto the mechanisms which transform them into rotary motion of the shaft 22, that is to say, the torques involved, can be very high but with a low frequency, even transforming the wave motion from transversal to longitudinal relative to the axis of the quay.

Similarly, the frequency of the level variation can also increase overcoming in this way the problem of the low frequency if an "on line" electricity recovery is used.

The damping of the wave for the port, the wharf and/or the coast in general, and the recovery of the potential energy with the variation in water level, even of just a few centimeters, to convert into electricity (a variation in level of a few tens of centimeters provides a unitary power of more than 0.5 kW per meter of quay), to be used, for example, for lighting the port itself and keeping the costs approximately to 10% of those of the quay, make the applicability of this system very attractive and with a possible extension even on a large scale.

For example, it should be noted that, according to the "sensitivity of the detector", it is possible to recover the energy which propagates in the water even after the passage of a boat at the outlet from the port or during navigation close to the quay.

More specifically, the system for recovery of the mechanical energy produced by the wave motion inserted inside a breakwater infrastructure allows the changes in the waves, which are often considerable, to be regulated, allowing the stabilisation of the mean undulation useful for the conversion of sussultatory motion into constant motion of the crank mechanism, with a greater efficiency in the use of the energy.

The invention as described above refers to a preferred embodiment. It is nevertheless clear that the invention is susceptible to numerous variations falling within the scope of the disclosure, in the context of technical equivalents.

The invention claimed is:

1. An infrastructure for protecting the shore, comprising: a platform having a lower part including vertical walls equipped with openings for passage of wave motion towards inner chambers, the infrastructure comprising a plurality of units for recovering energy from the wave motion, comprising floats connected by kinematic mechanisms connected to at least one rotation shaft which is in turn associated with at least one unit which transforms mechanical energy into electricity, the kinematic mechanisms being capable of converting sussultatory motion of the floats into rotary motion of the shaft and the unit for transforming the mechanical energy to electricity,
wherein the vertical walls comprise an outer wall, another outer wall, and at least one intermediate wall, each wall comprising openings positioned in an offset manner in the transverse direction of the infrastructure depending on their position on the vertical walls, in such a way that the wave motion can pass through the infrastructure breaking up subsequently during passage from one windowed wall to another windowed wall, the floats being placed in at least one of a plurality of inner chambers and connected by kinematic mechanisms to a plurality of free wheels crossed by the rotation shaft connected in turn to a hand wheel and in succession to the unit for transforming the mechanical energy of the shaft and of the hand wheel into electricity, wherein a thrust and consequent energy supply of the free wheels over the shaft derives from a sum of independent thrusts of each float.

2. The infrastructure according to claim 1, in which the floats are placed in an inner chamber between the outer wall facing towards an outside of the infrastructure relative to a direction of the wave motion and the intermediate wall, or in a chamber between the other outer wall and the intermediate wall.

3. The infrastructure according to claim 1, in which the kinematic mechanisms comprise linkages and/or rack devices, connected to a transmission shaft in turn connected to the unit for transforming the mechanical energy into electricity.

4. The infrastructure according to claim 3, in which the thrust and the consequent energy supply of the free wheels derives from various floats, irrespective of a relative offset to each other.

5. The infrastructure according to claim 4, in which energy transformation unit is mechanical or electromechanical, or is integrated electronically, and if the energy is intended to be accumulated, super-capacitors for charging accumulators are connected after the handwheel and the unit for transforming electricity, or a mechanism for accumulating potential energy to be later converted continuously is used to generate electricity with constant power.

6. The infrastructure according to claim 3, further comprising an rpm multiplier connected to the transmission shaft which drives an electricity generator to obtain the electricity at predetermined voltage and frequency conditions.

7. The infrastructure according to claim 3, in which the energy transformation unit is mechanical or electromechanical, or is integrated electronically, and if the energy is intended to be accumulated, super-capacitors for charging accumulators are connected after the handwheel and the unit for transforming mechanical energy into electricity, or a mechanism for accumulating potential energy to be later converted continuously is used to generate electricity with constant power.

8. The infrastructure according to claim 3, in which each unit for transforming the mechanical energy is positioned above the water level.

9. The infrastructure according to claim 1, in which each unit for transforming the mechanical energy is positioned above the water level.

10. The infrastructure according to claim 9, in which a transmission shaft, which is anchored to a wall of the infrastructure, is rotatably driven by the free wheels driven by the kinematic mechanisms during vertical oscillation of the floats.

11. The infrastructure according to claim 9, in which the thrust and the consequent energy supply of the free wheels derives from various floats, irrespective of a relative offset to each other.

12. The infrastructure according to claim 9, further comprising an rpm multiplier connected to a transmission shaft which drives an electricity generator to obtain the electricity at predetermined voltage and frequency conditions.

13. The infrastructure according to claim 9, in which energy transformation unit is mechanical or electromechanical, or is integrated electronically, and if the energy is intended to be accumulated, super-capacitors for charging accumulators are connected after the handwheel and the unit for transforming electricity, or a mechanism for accumulating potential energy to be later converted continuously is used to generate electricity with constant power.

14. The infrastructure according to claim 1, in which a transmission shaft, which is anchored to the wall of the infrastructure, is rotatably driven by the free wheels driven by the kinematic mechanisms during vertical oscillation of the floats.

15. The infrastructure according to claim 14, further comprising an rpm multiplier connected to a transmission shaft which drives an electricity generator to obtain the electricity at predetermined voltage and frequency conditions.

16. The infrastructure according to claim 14, in which energy transformation unit is mechanical or electromechanical, or is integrated electronically, and if the energy is intended to be accumulated, super-capacitors for charging accumulators are connected after the handwheel and the unit for transforming electricity, or a mechanism for accumulating potential energy to be later converted continuously is used to generate electricity with constant power.

17. The infrastructure according to claim 1, in which the vertical walls of the infrastructure are anchored to a bottom of a water basin by piles or tie rods.

18. The infrastructure according to claim 17, in which the tie rods are equipped with tensioners.

19. The infrastructure according to claim 1, in which dissipation of the wave motion which breaks against the openings of the vertical walls occurs by front diffraction and side reflection of a wave, thus obtaining a gradual attenuation.

* * * * *